United States Patent
Suzuki

(10) Patent No.: US 6,227,178 B1
(45) Date of Patent: May 8, 2001

(54) CONTROL SYSTEM OF COMBUSTION HEATER FOR INTERNAL COMBUSTION ENGINE

(75) Inventor: Makoto Suzuki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/193,431

(22) Filed: Nov. 17, 1998

(30) Foreign Application Priority Data

Nov. 18, 1997 (JP) .................................................. 9-317506

(51) Int. Cl.$^7$ .............................. F02G 5/00; F02M 35/10

(52) U.S. Cl. ............................................. 123/556; 123/550

(58) Field of Search .................................... 123/549, 550, 123/557, 568.11, 552, 553, 554, 555, 556, 543, 547, 551

(56) References Cited

U.S. PATENT DOCUMENTS

| | | | |
|---|---|---|---|
| 565,033 | * 8/1896 | Robison ................. | 123/557 |
| 2,290,300 | 7/1942 | Spackman . | |
| 3,526,214 | 9/1970 | Kamo ..................... | 123/122 |
| 3,756,022 | * 9/1973 | Pronovost et al. ...... | 60/645 |
| 3,893,300 | * 7/1975 | Connell .................. | 60/683 |
| 3,949,723 | * 4/1976 | Beesch .................. | 123/179 H |
| 3,963,000 | * 6/1976 | Kosaka et al. .......... | 123/3 |
| 4,002,025 | 1/1977 | Yamaguchi et al. ..... | 60/274 |
| 4,030,464 | 6/1977 | Yamaguchi et al. ..... | 123/122 |
| 4,131,086 | * 12/1978 | Noguchi et al. ........ | 123/3 |
| 4,169,448 | * 10/1979 | Hodge et al. ........... | 123/179.21 |
| 4,176,651 | 12/1979 | Backus .................. | 123/27 GE |
| 4,186,560 | * 2/1980 | Frankl .................... | 60/599 |
| 4,207,848 | * 6/1980 | Dinger et al. ........... | 123/556 |
| 4,212,162 | * 7/1980 | Kobayashi .............. | 60/39.63 |
| 4,215,550 | * 8/1980 | Dinger et al. ........... | 60/606 |
| 4,404,805 | * 9/1983 | Curtil .................... | 60/606 |
| 4,506,505 | * 3/1985 | Melzer ................... | 60/278 |

(List continued on next page.)

FOREIGN PATENT DOCUMENTS

| | | |
|---|---|---|
| 4411959 | 10/1995 | (DE) . |
| 0271999 | 6/1988 | (EP) . |
| 1497428 | 12/1967 | (FR) . |
| 2381175 | 9/1978 | (FR) . |
| 2041081 | 9/1980 | (GB) . |
| 1595060 | 8/1981 | (GB) . |
| 62-75069 | 4/1987 | (JP) . |
| 918466 | 4/1980 | (RU) . |

OTHER PUBLICATIONS

Patent Abstracts of Japan, vol. 018, No. 600 (P–1826), Nov. 15, 1994 & JP 06 222867 A (Sharp Corp.), Aug. 12, 1994.

Patent Abstracts of Japan, vol. 005, No. 033 (M–057), Feb. 28, 1981 & JP 55 160158 A (Nissan Motor Co., Ltd.), Dec. 12,1980.

Primary Examiner—Willis R. Wolfe
Assistant Examiner—Hai Huynh
(74) Attorney, Agent, or Firm—Kenyon & Kenyon

(57) ABSTRACT

A control system of a combustion heater for an internal combustion engine to provide satisfactory combustion in a combustion chamber of the internal combustion engine even when an exhaust gas produced by the combustion heater is introduced into an intake system of the internal combustion engine. The combustion heater 7 performs a combustion with a fuel supplied by a pump 7b and fresh air supplied by a fan 7c. The exhaust gas produced by the combustion heater 7 is introduced into an intake passageway 2 of an engine body 1. An electronic control unit 15 controls the combustion state of the combustion heater by controlling the number of rotations of the pump 7b and the fan 7c based on the fuel quantity supplied to the engine body 1. Thus, satisfactory combustion in the combustion chamber of the engine body 1 is accomplished.

14 Claims, 3 Drawing Sheets

U.S. PATENT DOCUMENTS

| | | | |
|---|---|---|---|
| 4,625,910 | * 12/1986 | Kawamura | 237/2 A |
| 4,744,747 | * 5/1988 | Kawamura et al. | 431/36 |
| 4,749,028 | * 6/1988 | Okura et al. | 165/42 |
| 4,836,445 | 6/1989 | Okada . | |
| 4,858,825 | 8/1989 | Kawamura . | |
| 4,927,077 | 5/1990 | Okada . | |
| 5,377,440 | 1/1995 | Eller et al. | 431/11 |
| 5,402,757 | 4/1995 | Eller et al. | 123/179.21 |
| 5,724,813 | * 3/1998 | Fenelon et al. | 60/606 |
| 5,740,786 | * 4/1998 | Gartner | 123/568.12 |
| 5,806,308 | * 9/1998 | Khair et al. | 60/278 |
| 5,823,170 | * 10/1998 | Sienicki | 123/551 |
| 5,894,834 | * 4/1999 | Kim | 123/552 |
| 5,927,075 | * 7/1999 | Khair | 60/605.2 |
| 5,950,420 | 9/1999 | Geiger . | |
| 6,053,144 | * 4/2000 | Greenwood et al. | 123/294 |
| 6,055,964 | * 5/2000 | Suzuki | 123/550 |
| 6,119,660 | * 9/2000 | Suzuki | 123/501 |
| 6,131,553 | * 10/2000 | Suzuki | 123/556 |

* cited by examiner

CONTROL SYSTEM OF COMBUSTION HEATER FOR INTERNAL COMBUSTION ENGINE

BACKGROUND OF THE INVENTION

The present invention relates generally to a technology of heating related elements to an internal combustion engine and, more particularly, to a control system of a combustion heater for heating constituting elements of the internal combustion engine with heat generated when burning a fuel.

In the internal combustion engine, an operability is deteriorated with an increased friction in a low-temperature state, and with this deterioration a fuel efficiency worsens or causing an increase in noises. Further, there arises a problem, wherein a related device operating in connection with the internal combustion engine such as, in a vehicle, for example, a car-room heater with the cooling water of the internal combustion engine serving as a thermal source, is deteriorated in its function when the internal combustion engine is at the low temperature, i.e., when the temperature of the cooling water is low.

Accordingly, it is required that the internal combustion engine is provided with a heating device for increasing the temperature of the internal combustion engine itself or a temperature of the related element to the internal combustion engine itself when in a warm-up process after a start-up or when an exothermic quantity of the engine itself is small. This necessity is remarkable especially in a diesel engine with a small exothermic quantity and becomes more remarkable with a tendency of reducing the fuel consumption in recent years.

Such being the case, Japanese Patent Laid-Open Publication No. 62-75069 discloses a technology of improving a starting characteristic by speeding up the warm-up of the internal combustion engine. According to this technology, a rise in temperature of the internal combustion engine body is speeded up by speeding up a rise in temperature of the cooling water by providing a combustion heater for heating the cooling water. In this technology, the attention is paid to a temperature when starting the internal combustion engine. In addition to the starting time of the internal combustion engine, however, the temperature of the internal combustion engine becomes comparatively low also when the exothermic quantity of the internal combustion engine itself is small, e.g., when a quantity of fuel consumption in the combustion chamber is small. In such a case also, it is advantageous to the internal combustion engine itself or the related element thereto to provide the combustion heater.

Although the combustion of the combustion heater continues during an operation of the internal combustion engine for a short while after the start-up thereof, the exhaust gas from the combustion heater is led into the combustion chamber via the intake passageway. Therefore, the heat of the exhaust gas can be collected in the internal combustion engine, and it follows that an effect of rising the temperature of the internal combustion engine is obtained.

In the case of introducing the exhaust gas of the combustion heater into the intake passageway during the operation of the internal combustion engine, however, if the exhaust gas is led into the intake passageway without taking into consideration a combustion state in the combustion chamber of the internal combustion engine, there arises a problem of causing a deterioration of the combustion state in the combustion chamber. For instance, a quantity of the exhaust gas introduced into the combustion chamber from the combustion heater becomes larger, a quantity of fresh air taken in from the atmospheric air becomes smaller. If the quantity of fuel supplied to the combustion chamber is large and a load on the internal combustion engine is high, an air/fuel ratio in the combustion chamber might change to be rich, with the result that more smoke is emitted.

SUMMARY OF THE INVENTION

It is a primary object of the present invention, which was devised to obviate the problems described above, to provide a control system of a combustion heater for an internal combustion engine that is constructed to provide satisfactory combustion in the combustion chamber of the internal combustion engine even when an exhaust gas of the combustion heater is led into an intake system of the internal combustion engine.

To accomplish the above object, the control system of the combustion heater for the internal combustion engine according to the present invention takes the following construction.

Specifically, the present invention is based on the knowledge that if the exhaust gas of the combustion heater is introduced into the intake system when the quantity of fuel supplied to the combustion chamber is large (at the time of high load), the quantity of fresh air taken in is reduced, and, therefore, it is concluded that introduction of the exhaust gas of the combustion chamber to the intake system should be better discontinued when the quantity of fuel supplied to the combustion chamber is large. From this point of view, the present invention is accomplished such that in a control system of a combustion heater for an internal combustion engine in which a related element to said internal combustion engine is heated by burning a fuel and an exhaust gas produced when burning the fuel is discharged into an intake system of said internal combustion engine, the control system controls a combustion state of the combustion heater based on an engine load.

Specifically, the engine load can be determined from such parameters as the number of revolutions of the engine, the quantity of intake air, an engine fuel injection quantity, a degree of opening of accelerator, and the like. Thus, the control system of the present invention can be exemplified to control the combustion state of the combustion heater by a fuel control device according to the quantity of fuel supplied to the combustion chamber of the internal combustion engine, or the number of revolutions of the engine, the quantity of intake air, the degree of opening of accelerator, and the like.

According to a second aspect, in the control system of the combustion heater for the internal combustion engine according to the first aspect of the invention, the control system controls, when the engine load is large, for example, the quantity of fuel supplied to the combustion chamber by the fuel control device is large, the combustion state of the combustion heater so that the quantity of the exhaust gas produced is lowered than when the engine load is small, for example, the quantity of fuel supplied to the combustion chamber is small.

According to a third aspect of the present invention, in the control system of the combustion heater for the internal combustion engine according to the second aspect of the invention, the combustion heater performs the combustion with the fuel fed by pressure from a fuel pump and air supplied by an air supplying device, and the control system controls the combustion state of the combustion heater by controlling at least one or both of the fuel pump and the air supplying device.

According to a fourth aspect of the present invention, in the control system of the combustion heater for the internal combustion engine according to the first aspect of the invention, the related element to the internal combustion engine is a cooling liquid for cooling the internal combustion engine.

According to a fifth aspect of the present invention, in the control system of the combustion heater for the internal combustion engine according to the fourth aspect of the invention, the internal combustion engine is a power source for driving a vehicle, the vehicle has a car room heater for heating a car room, and the car room heater uses the cooling water as a thermal source.

According to the present invention, the control system controls the combustion state of the combustion heater according to the quantity of fuel supplied to the combustion chamber by the fuel control device, the specific controls are exemplified as follows.

When the fuel injection quantity is larger than a predetermined value, the quantity of fuel supplied to the combustion heater is reduced, and when the fuel injection quantity is smaller than the predetermined value, the quantity of fuel supplied to the combustion heater is increased.

At this time, the number of revolutions of the engine may also be taken into consideration. Namely, when the number of revolutions of the engine is higher than a predetermined value and the fuel injection quantity is large than the predetermined value, the quantity of fuel supplied to the combustion heater is reduced, and when the number of revolutions of the engine is lower than the predetermined value and the fuel injection quantity is smaller than the predetermined value, the quantity of fuel supplied to the combustion heater is increased.

Also, when the fuel injection quantity is larger than the predetermined value, the quantity of fresh air supply to the combustion heater may be reduced, and when the fuel injection quantity is smaller than the predetermined value, the quantity of fresh air supply to the combustion heater may be increased.

In addition, it is also possible to take the number of revolutions of the engine into consideration. Namely, when the number of revolutions of the engine is higher than the predetermined value and the fuel injection quantity is larger than the predetermined value, the quantity of fresh air supply to the combustion heater is reduced, and when the number of revolutions of the engine is lower than the predetermined value and the fuel injection quantity is smaller than the predetermined value, the quantity of fresh air supply to the combustion heater is increased.

The present invention comprises an intake passageway as an intake system of the internal combustion engine. This intake passageway is communicated with a heater intake passageway for supplying the fresh air to the combustion heater from the intake passageway, and with a heater gas discharge passageway for returning the combustion gas of the combustion heater to the intake passageway, and it is preferable that the heater intake passageway and the heater gas discharge passageway are connected respectively at a point where a differential pressure of the intake fresh air is small in the intake passageway communicated with the internal combustion engine. With this arrangement, the differential pressure of the intake fresh air is not to become excessive, thereby, a fresh air flow rate does not become excessive. Consequently, this assures satisfactory ignition of the heater.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
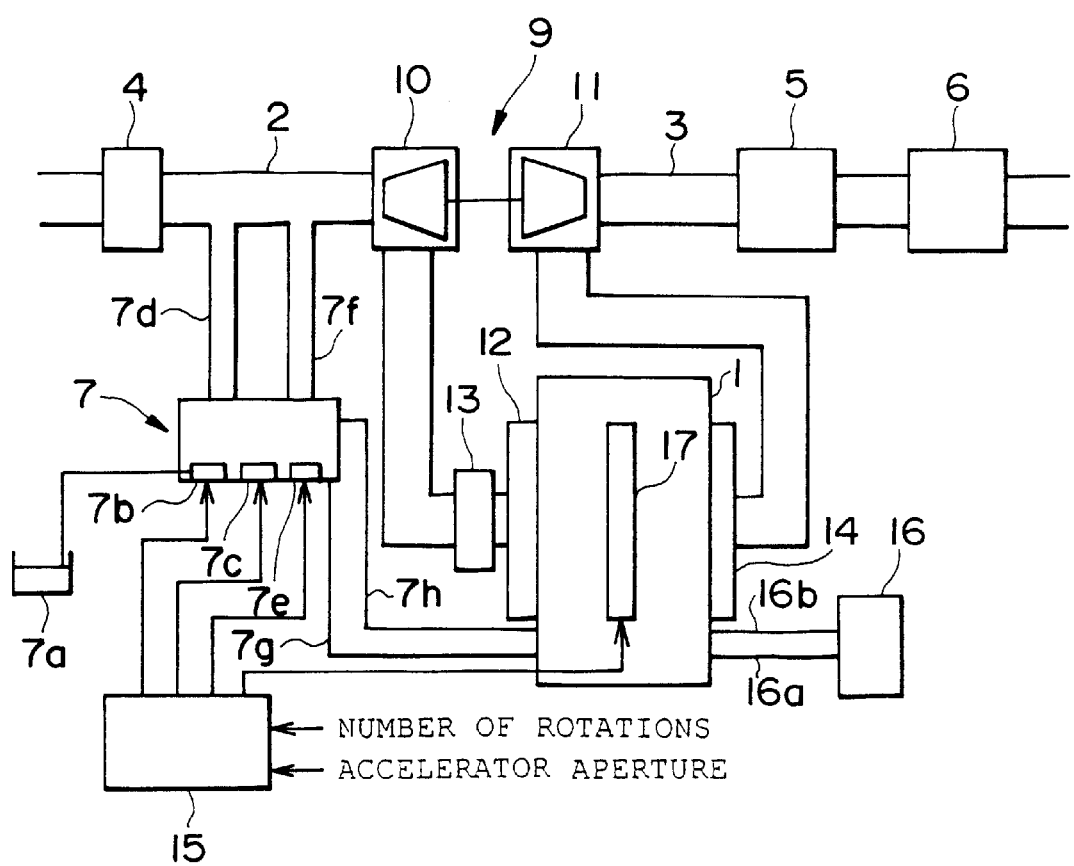
FIG. 1 is a diagram showing a whole diesel engine.

FIG. 1 shows a case where the present invention is applied to a 4-stroke diesel engine for a vehicle.

Referring to FIG. 1, there are illustrated an engine body 1, an intake passageway 2, an exhaust gas discharge passageway 3, an intake manifold 12 and an exhaust manifold 14, respectively. An air cleaner 4 is provided upstream of the intake passageway 2. Further, a catalyst 5 and a silencer 6 are provided downstream of the exhaust gas passageway 3. Moreover, in accordance with this embodiment, a turbo charger 9, which is provided as a supercharger, is constructed of a compressor 10 provided in the intake passageway 2 between the air cleaner 4 and the intake manifold 12, and of a turbine 11 provided between the exhaust manifold 14 and the catalyst 5. Note that an inter-cooler 13 for cooling the intake air is provided in the intake passageway 2 disposed downstream of the compressor 10.

A cooling water passageway (not shown) is formed within the engine body 1, and the engine body 1 is cooled by circulating the cooling water through this cooling water passageway. A car room heater 16 functions to heat the interior of the car room by radiating the heat of the cooling water circulated through heater cooling water passageways 16a, 16b from the cooling water passageway of the engine body 1.

A combustion heater 7 vaporizes a fuel introduced by a pump 7b from a fuel source 7a with fresh air introduced into a heater intake passageway 7d, and burns the vaporized fuel with an ignition by an ignition means 7e. Further, the combustion heater 7 discharges a combustion gas generated during a burning process via a heater gas discharger passageway 7f. The heater intake passageway 7d is connected to the intake passageway 2 between the air cleaner 4 and the compressor 10, and the heater gas discharge passageway 7f is connected to the intake passageway 2 disposed downstream of the heater intake passageway 7d between the air cleaner 4 and the compressor 10.

The cooling water in the cooling water passageway of the engine body 1 is circulated through combustion heater cooling water passageways 7g, 7h in the combustion heater 7, and the thus circulated cooling water receives the heat emitted during the burning process of the combustion heater 7, thereby a temperature of the cooling water rises.

Here, the pump 7b and a fan 7c are constructed so that the numbers of rotations thereof are controllable, and an electronic control unit 15 generates signals for controlling the number of rotations of the pump 7b and the number of rotations of the fan 7c on the basis of an engine fuel injection quantity.

Specifically, for example, when the fuel injection quantity is larger than a predetermined value, the quantity of fuel supplied to the combustion heater is reduced by the pump 7b, and also the quantity of fresh air supplied to the combustion heater is reduced by reducing the number of rotations of the fan 7c. And, reversed controls are made when the fuel injection quantity is smaller than the predetermined value.

The same controls as described above may be made by using not only the fuel injection quantity, but also parameters indicating the engine load, such as, the number of revolutions of the engine, the quantity of intake air, or a degree of opening of accelerator.

Note that the engine body 1 is supplied with the fuel through a fuel injection valve 17, and the quantity of fuel supplied is controlled by the electronic control unit 15. Further, the fuel supply quantity is set based on the degree of opening of an unillustrated accelerator and the number of revolutions of the engine body 1.

Figure 2:
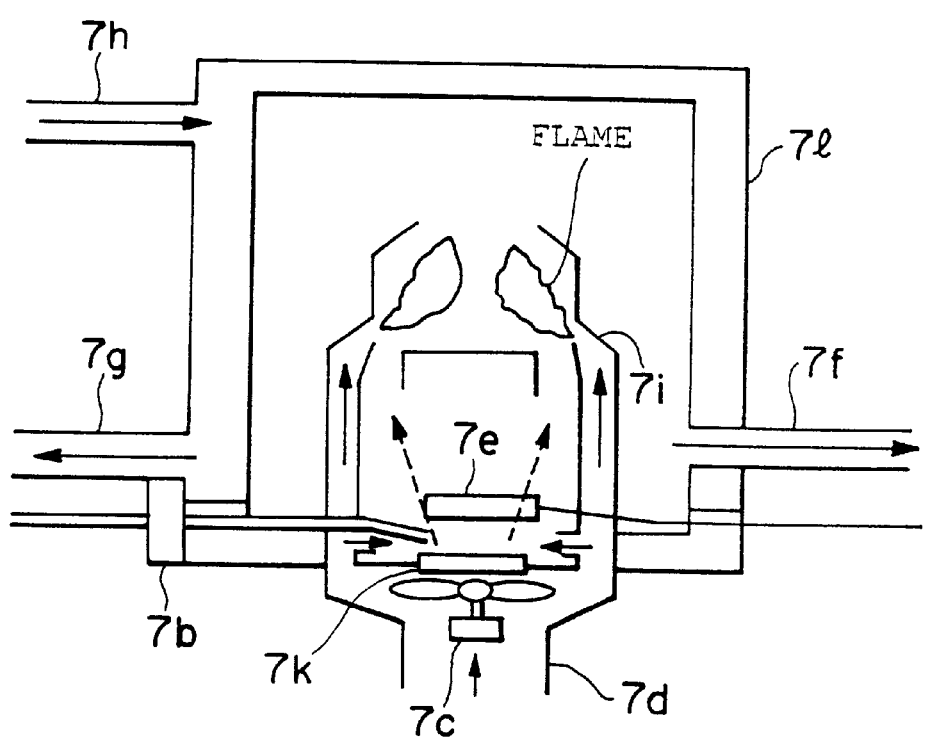
FIG. 2 is a diagram showing a combustion heater in detail.

Next, the combustion heater 7 described above will be discussed in greater detail referring to FIG. 2.

The fresh air introduced from the intake passageway 2 is sucked by the fan 7c via the heater intake passageway 7d and flown through a heater internal fresh air passageway 7i. Further, the pump 7b supplies the fuel from the fuel source 7a and feeds the fuel into a fuel vaporizing chamber 7j. The fuel fed into the fuel vaporizing chamber 7j is then supplied to a ceramic cloth 7k and vaporized (as indicated by broken arrow lines in FIG. 2) with the fresh air supplied from the fan 7c, then mixed with the fresh air (as indicated by solid arrow lines in FIG. 2) from the heater internal fresh air passageway 7i and thus burned. The combustion gas produced during burning is discharged as an exhaust gas from the heater gas discharge passageway 7f and thereafter introduced into the intake passageway 2. It is to be noted that the ignition means 7e is constructed of a ceramic heater. A combustion heater internal cooling water passageway 7l is formed externally of the combustion heater 7, and the cooling water introduced via the combustion heater cooling water passageway 7h is circulated through the combustion heater cooling water passageway 7l, then receives the combustion heat, and is discharged from a combustion heater cooling water passageway 7g.

In the thus constructed embodiment, the temperature of the cooling water can be increased by the combustion heater 7, thereby increasing the temperature of the engine body 1 and enhancing a function of the car room heater 16.

Note that in the intake passageway 2, there are air resisting structures, such as, for example, the air cleaner, the inter-cooler or the like, and further, wall surface resistances of the intake passageway, and a differential pressure occurs at the front and back of each of these air resisting structures. In this embodiment, the heater intake passageway 7d and the heater gas discharge passageway 7f are respectively connected at portions where the differential pressure of the intake fresh air is small in the intake passageway 2, thereby the ignition characteristics of the ignition means 7e is improved. In other words, the fresh air is introduced into the combustion heater 7 by the fan 7c, however, if there is a large differential pressure between connecting points of the heater intake passageway 7d and the heater gas discharge passageway 7f to the intake passageway 2, a flow rate of the fresh air introduced into the combustion heater 7 increases. This might lead to such a possibility that the ignition by the ignition means 7e becomes difficult because of the vaporizing unit being cooled off or an increase in flow velocity of the vaporized fuel gas. By contrast, this embodiment takes such a construction that the air resisting structures such as, e.g., the air cleaner, the inter-cooler and the like are not disposed at the connecting points of the heater intake passageway 7d and the heater gas discharge passageway 7f to the intake passageway 2. With this construction, neither the pressure difference nor the fresh air flow rate becomes excessive. Hence, the favorable ignition characteristic can be kept.

Further, the heater gas discharge passageway 7f may be connected to the exhaust gas passageway 3, however, as well known, the exhaust gas passageway 3 has a high pressure and further pulsations occurred therein, and hence there might be a possibility that the combustion heater 7 may have an accidental fire due to a back-flow of the exhaust gas. In this embodiment, since the heater gas discharge passageway 7f is connected to the intake passageway 2, the back-flow described above is not produced, and the accidental fire can be prevented. Moreover, a thermal energy of the exhaust gas can be collected in the engine body 1 because of the exhaust gas of the combustion heater 7 being introduced into the intake passageway, and an effect in rising the temperature of the engine body 1 can be further enhanced.

Figure 3:
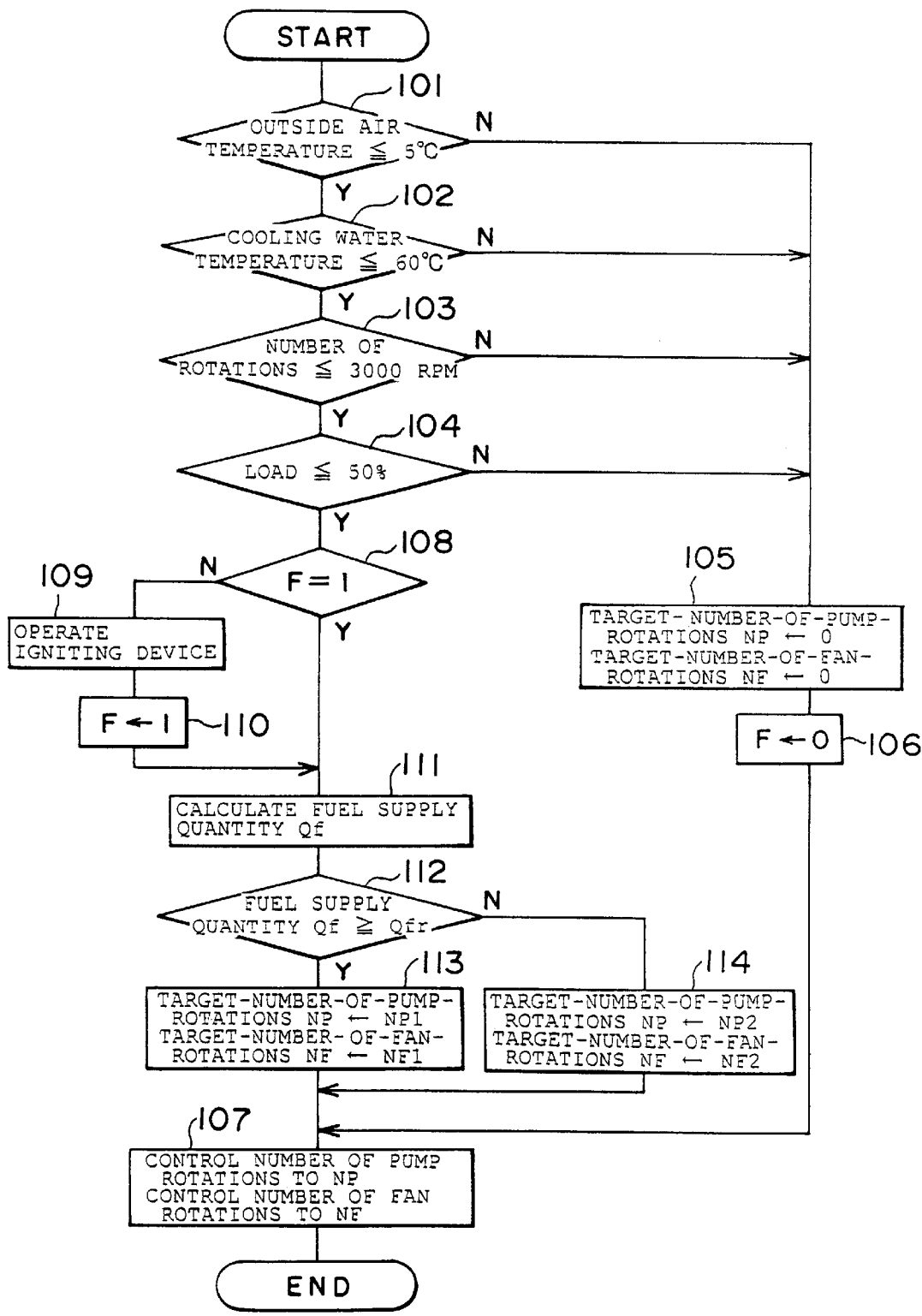
FIG. 3 is a flowchart showing how the combustion heater is controlled.

FIG. 3 is a control flowchart of the pump 7b and the fan 7c of the combustion heater 7. Processing in this flowchart begins with a start-up of the internal combustion engine 1 and is executed at an interval of a predetermined time.

To start with, it is judged in step 101 whether an outside air temperature is 5° C. or under. It is judged in step 102 whether a cooling water temperature is 60° C. or under. It is judged in step 103 whether the number of revolutions of the engine body 1 is 3000 rpm or under. It is judged in step 104 whether a load (corresponding to the degree of opening of an unillustrated accelerator) of the engine body 1 is 50% or under. If judged to be affirmative in all of steps 101–104, the processing proceeds to step 108. If judged to be negative in even one of steps 101–104, the processing advances to step 105. An operation in such a state that all the results in steps 101–104 are judged to be affirmative, implies an operation state where the combustion heater 7 is required to be operated. Namely, if the outside air temperature is low (step 101), if the cooling water temperature is low (step 102), and if the exothermic quantity of the engine body 1 itself is small (steps 103 and 104), it is required that the combustion heater 7 be operated.

Here, the reason why the combustion heater 7 is required to be operated only when the exothermic quantity of the engine body 1 itself is small as in steps 103 and 104, is that the temperature of the cooling water can be, when the exothermic quantity of the engine body 1 itself is large, increased sufficiently by this exothermic quantity, and an influence of the intake passageway 2 upon other devices due to the heat of the exhaust gas can be reduced because of the structure of introducing the exhaust gas of the combustion heater 7 into the intake passageway 2.

If judged to be negative in even one of steps 101–104, the processing proceeds to step 105, where a target number-of-rotations NP of the pump 7b and a target-number-of-rotations NF of the fan 7c are set to "0". In step 106, a flag F is set to "0", and the processing advances to step 107. In step 107, the electronic control unit 15 controls the numbers of the rotations of the pump 7b and the fan 7c to the target-number-of-pump-rotations NP and the target-number-of-fan-rotations NF.

If judged to be affirmative in all of steps 101–104, it is judged in step 108 whether or not the flag is "0". If the processing advances to step 108 in a state where the combustion heater 7 does not operate, the flag F is "0" and therefore the judgement is negative. Then, in step 109, the electronic control unit 15 executes such a control process that the ignition means 7e operates for a predetermined period of time. Subsequently, the flag F is set to "1" in step 110, and the processing advances to step 111. If judged to be affirmative in step 108, this implies a state where the combustion of the combustion heater 7 is already executed, and the processing proceeds to step 111 without operating the ignition means 7e.

In step 111, a fuel supply quantity Qf to the engine body 1 is detected. Here, the fuel supply quantity Qf is a quantity per one rotation of the engine 1, and is calculated by an unillustrated arithmetic means from the load, the number of rotations, and the like.

When the calculation of the fuel supply quantity Qf is finished in step 111, it is judged in step 112 whether the fuel supply quantity Qf is a judgement value Qfr or above. If the fuel supply quantity Qf is larger than the judgement value Qfr, the processing advances to step 113, where the target-number-of-pump-rotations NP is set to NP1 and the target-number-of-fan-rotations NF is set to NF1. Whereas if the fuel supply quantity Qf is smaller than the judgement value Qfr, the processing advances to step 114, wherein the target-number-of-pump-rotations NP is set to NP2 and the target-number-of-fan-rotations NF is set to NF2. Herein, relationships between NP1 and NP2, and between NF1 and NF2 are NP1<NP2, and NF1<NF2.

Then, the target-number-of-pump-rotations NP and the target-number-of-fan-rotations NF are set in step 113 or 114, the processing advances to step 107, in which the electronic control unit 15 controls the number of rotations of the fuel pump and the number of rotations of the fan to the target-number-of-pump-rotations NP and to the target-number-of-fan-rotations NF.

As discussed above, in accordance with this embodiment, when the fuel supply quantity Qf to the engine body 1 is larger than the judgement value Qfr, the numbers of the rotations of the pump 7b and of the fan 7c are set to the smaller values NP1 and NF1, with the result that the output of the combustion heater 7 decreases and a generation quantity of the exhaust gas decreases. Accordingly, the reduction of the fresh air quantity sucked in the engine can be restrained, and an air/fuel ratio in the combustion chamber is controlled not to be rich, whereby an emission of smoke can be restrained.

In this embodiment, the target-number-of-pump-rotations and the target-number-of-fan-rotations are switched from the first value to the second value depending on whether the fuel injection quantity is above the judged value or not. However, the target-number-of-pump-rotations and the target-number-of-fan rotations may be calculated to correspond with the fuel injection quantity by a correlation equation, or a data such as a corresponding map is prepared and the target number of rotations of the pump or the fan may be made variable to meet the result of such calculation, or to meet the data value of the map.

Next, another embodiment of the present invention will be described.

In this embodiment, the combustion state of the combustion heater is controlled according to the number of revolutions of the engine, in addition controlling the combustion state of the combustion heater according to the fuel injection quantity as described above.

Here, the electronic control unit 15 generates signals to control the numbers of rotations of the pump 7b and the fan 7c based on the number of revolutions of the engine and the engine fuel injection quantity.

Namely, when the number of revolutions of the engine is higher than the predetermined value and, in addition, the fuel injection quantity is larger than the predetermined value, the quantity of fuel supplied to the combustion heater is reduced by the pump 7b, and the quantity of fresh air supplied to the combustion heater is reduced by reducing the number of rotations of the fan 7c. The reversed controls are effected when the number of revolutions of the engine is lower than the predetermined value and the fuel injection quantity is smaller than the predetermined value.

According to the gist of the present invention, introduction of the exhaust gas of the combustion heater to the intake system may be discontinued also in the case of instantaneously increasing the quantity of fuel at the time of, for example, accelerating the vehicle.

According to the present invention, the combustion state in the combustion chamber of the internal combustion engine can be well controlled by controlling the combustion state of the combustion heater according to the fuel quantity supplied to the internal combustion engine.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled In the art, it is not desired to limit the invention to the exact construction and operation illustrated and described, and accordingly all suitable modifications and equivalents may be resorted to, falling within the scope of the invention.

What is claimed is:

1. A control system of a combustion heater for an internal combustion engine in which the combustion heater supplies heat to the internal combustion engine by burning a fuel, and a combustion gas produced when burning the fuel in the combustion heater is discharged into an intake system of the internal combustion engine, wherein the combustion gas from the combustion heater, air from the intake system and fuel are introduced into said internal combustion engine so that a power is obtained by burning the fuel, and the control system controls a combustion state of the combustion heater based on engine load.

2. A control system of a combustion heater for an internal combustion engine according to claim 1, wherein said control system controls the combustion state of the combustion heater based on at least one of parameters of the number of revolutions of the engine, the quantity of intake air, an engine fuel injection quantity, and a degree of opening of accelerator, as an engine load.

3. A control system of a combustion heater for an internal combustion engine according to claim 1, wherein said control system controls the combustion state of the combustion heater, when the engine load is large, to reduce the quantity of exhaust gas generation, as compared to the case where the engine load is small.

4. A control system of a combustion heater for an internal combustion engine according to claim 1, wherein said internal combustion engine includes a fuel control device for controlling the quantity of fuel supplied to the combustion chamber according to an operation state; and said control system controls the combustion state of the combustion heater, when the quantity of fuel supplied to the combustion chamber by said fuel control device, to reduce the quantity of exhaust gas generation, as compared to the case where the quantity of fuel supplied to the combustion chamber is small.

5. A control system of a combustion heater for an internal combustion engine according to claim 1, wherein said combustion heater performs combustion with the fuel fed by pressure from a fuel pump and air supplied by an air supplying device; and said control system controls the combustion state of said combustion heater by controlling at least one or both of said fuel pump and said air supplying device.

6. A control system of a combustion heater for an internal combustion engine according to claim 1, wherein said related element to said internal combustion engine is a cooling liquid for cooling said internal combustion engine.

7. A control system of a combustion heater for an internal combustion engine according to claim 6, wherein said internal combustion engine is a power source for driving a vehicle;

said vehicle has a car room heater for heating a car room; and said car room heater uses said cooling liquid as a thermal source.

8. A control system of a combustion heater for an internal combustion engine according to claim 1, wherein the quantity of fuel supplied to the combustion heater is reduced when the fuel injection quantity is larger than a predetermined value, and the quantity of fuel supplied to the combustion heater is increased when the fuel injection quantity is smaller than the predetermined value.

9. A control system of a combustion heater for an internal combustion engine according to claim 1, wherein the quantity of fuel supplied to the combustion heater is reduced when the number of revolutions of the engine is higher than a predetermined value and the fuel injection quantity is larger than the predetermined value, and the quantity of fuel supplied to the combustion heater is increased when the number of revolutions of the engine is lower than the predetermined value and the fuel injection quantity is smaller than the predetermined value.

10. A control system of a combustion heater for an internal combustion engine according to claim 1, wherein the quantity of fresh air supplied to the combustion heater is reduced when the fuel injection quantity is larger than the predetermined value, and the quantity of fresh air supplied to the combustion heater is increased when the fuel injection quantity is smaller then the predetermined value.

11. A control system of a combustion heater for an internal combustion engine according to claim 1, wherein the quantity of fresh air supplied to the combustion heater is reduced when the number of revolution of the engine is higher than the predetermined value and the fuel injection quantity is larger than the predetermined value, and the quantity of fresh air supplied to the combustion heater is increased when the number of revolutions of the engine is lower than the predetermined value and the fuel injection quantity is smaller than the predetermined value.

12. A control system of a combustion heater for an internal combustion engine according to claim 1, comprising an intake passageway as an intake system for the internal combustion engine, said intake passageway is connected to a heater intake passageway for supplying fresh air to the combustion heater from the intake passageway and to a heater gas discharge passageway for returning a combustion gas of the combustion heater to said intake passageway; and wherein said heater intake passageway and said heater gas discharge gas passageway are respectively connected at a point where a differential pressure of intake fresh air is small, in the intake passageway to the internal combustion engine.

13. A control system of a combustion heater for an internal combustion engine according to claim 1, wherein a quantity of the combustion gas is controlled by preventing the air-fuel ratio being rich so as to lessen the generation of smoke.

14. A control system of a combustion heater for heating an internal combustion engine in which the combustion heater supplies heat to the internal combustion engine by burning a fuel, and a combustion gas produced when burning the fuel in the combustion heater is discharged into an intake system of the internal combustion engine, wherein the combustion gas from the combustion heater/ air from the intake system and fuel are introduced into said internal combustion engine so that a power is obtained by burning the fuel, and the control system controls a combustion state of the combustion heater based on engine load so that a desired combustion state is maintained within the internal combustion engine.

* * * * *